March 14, 1967 R. J. BRONIKOWSKI 3,309,477
PROTECTIVE MEANS FOR ENCASED ELECTRICAL APPARATUS
Filed Nov. 25, 1964
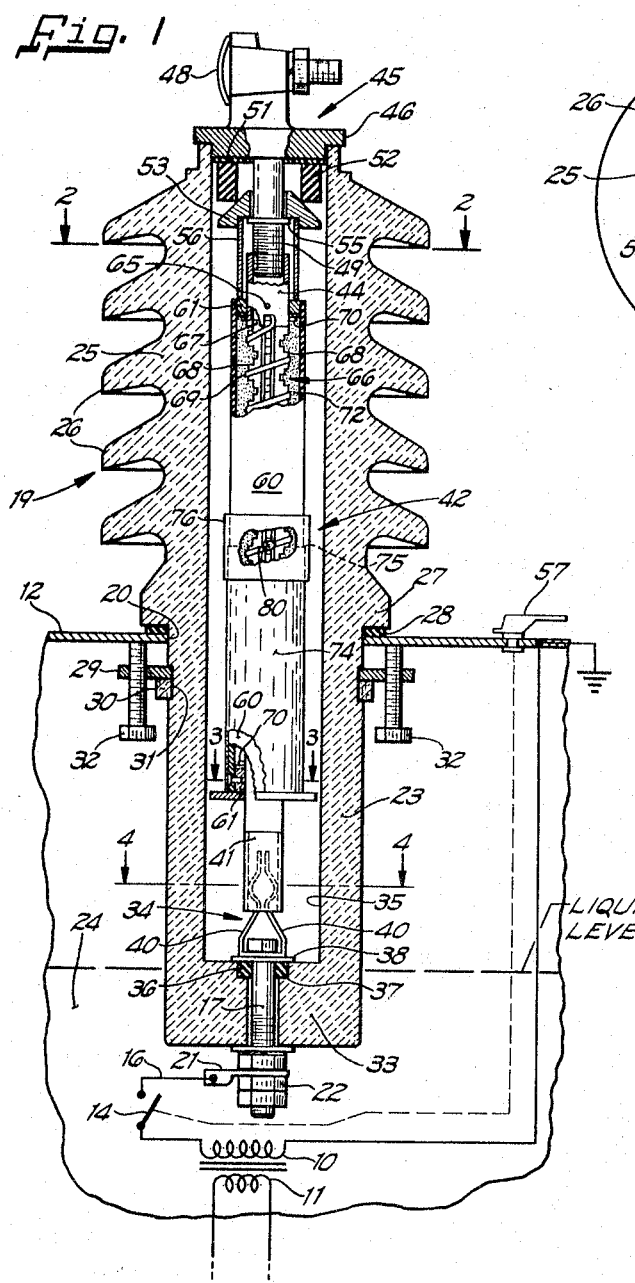
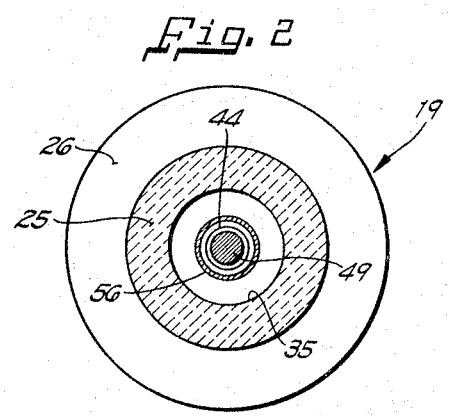
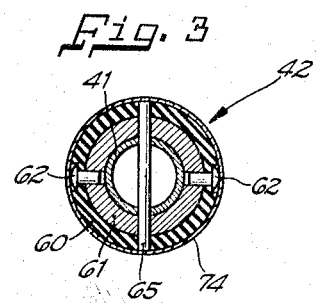
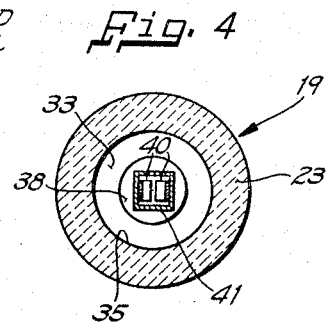
INVENTOR.
Raymond J. Bronikowski
BY
Lee H. Kaiser
Attorney

United States Patent Office 3,309,477
Patented Mar. 14, 1967

3,309,477
PROTECTIVE MEANS FOR ENCASED ELECTRICAL APPARATUS
Raymond J. Bronikowski, South Milwaukee, Wis., assignor to McGraw-Edison Company, Milwaukee, Wis., a corporation of Delaware
Filed Nov. 25, 1964, Ser. No. 413,800
5 Claims. (Cl. 200—113)

This invention relates to the protection of encased electrical apparatus and, in particular, to the protection of high voltage, encased electrical apparatus by fuses.

High voltage electrical apparatus such as distribution transformers are frequently connected to a power system through primary fuses. The primary fuse disconnects its associated distribution transformer from the primary feeder when a transformer fault or low impedance secondary-circuit fault occurs. The blowing of the primary fuse prevents an interruption of service to other loads supplied over the feeder, but interrupts service to all consumers supplied by its transformer. In the so-called conventional transformer, the protective link is in a fused cutout mounted separately on the pole which provides a convenient means for disconnecting the transformer for inspection and maintenance. In the so-called completely protected transformer, the protective link is within the transformer casing.

Transformer fuses are usually of the expulsion type wherein the fusible element is mounted within a gas generating fuse tube, and the explosive force of a confined arc is utilized to expel gas from the fuse tube and thus interrupt the arc. Although transformer fuses are principally used to protect the power system and prevent interruption of service to other loads supplied over the same feeder, the transformer fuse does provide some degree of protection to the transformer itself. Transformer primary fuses, however, provide no protection to the transformer itself against a low impedance primary internal fault when the available fault current is relatively high. Even when the primary fuse is capable of clearing high magnitude fault current, extensive damage and possible explosion of the transformer can occur before the fault is cleared. An expulsion fuse can only clear a current at a normal current zero and requires at least one half cycle to one cycle of current flow in order to interrupt the circuit. The duration of fault current flow may be in the range of from one half cycle to one cycle or greater dependent upon such factors as the magnitude of fault current, the melting time of the fuse, the point in the cycle at which the fault is initiated, and the characteristic of the fuse. Fault current above several thousand amperes persisting for one cycle may result in blowing off of the transformer casing cover, discharge of flaming oil with consequent danger to personnel and adjacent equipment, and severe damage to the transformer. At still higher magnitudes of fault current, the entire transformer casing may explode and shower flaming oil.

When the primary fuse requires more than one cycle to clear the fault or is incapable of interrupting the fault current, the damage to the transformer is still more severe and the hazard to personnel and surrounding equipment from explosion and flaming oil is still greater.

Application Ser. No. 298,882 filed Jan. 21, 1963, now Patent No. 3,235,696, in the name of Harvey W. Mikulecky and having the same assignee as the present invention, discloses a disconnectable non-expulsion current limiting device for protecting electrical apparatus which is capable of interrupting fault current of high magnitude and of limiting the current to a magnitude smaller than the available fault current without evolution of large amounts of gas and ionized particles. However, the apparatus disclosed in aforementioned application Ser. No. 298,882, now Patent No. 3,235,696, includes a mounting for the current limiting protective device separate from the housing for the electrical apparatus to be protected.

It is an object of the invention to provide encased electrical apparatus protected by an internally mounted current limiting fuse capable of interrupting current of short circuit magnitude without evolution of large amounts of gas and ionized particles and of limiting the current to a magnitude smaller than the available fault current and having novel means for increasing the magnitude of current which the fuse can interrupt.

Another object of the invention is to provide a high voltage, current limiting fuse construction adapted for mounting in a position wherein it extends through the grounded casing of electrical apparatus to be protected and which has novel means for raising corona and radio noise starting voltages. A further object is to provide such current limiting fuse construction adapted to extend through the ground plane of an electrical apparatus casing and which has extremely compact insulation.

These and other objects and advantages of the invention will be more readily apparent from the following detailed description when read in connection with the accompanying drawing wherein:

FIG. 1 is a partial sectional view through electrical apparatus having integral current limiting fuse means in accordance with the invention for protecting the apparatus; and FIGS. 2, 3 and 4 are views taken on lines 2—2, 3—3 and 4—4, respectively, of FIG. 1.

Referring to the drawing, an encased electrical apparatus such as a distribution transformer is illustrated as having a primary winding 10 and a secondary winding 11 housed within a metallic casing 12 which may be grounded and connected to one end of the primary winding 10. The other end of primary winding 10 may be connected by a conductor 16 to a conductive bolt 17 positioned at the lower end of a primary electrical insulating bushing 19 extending through an aperture 20 in casing 12. If desired, a load-break switch 14 may be connected between primary winding 10 and the primary bushing. Conductor 16 may have a terminal 21 crimped thereto provided with an eye which fits over conductive bolt 17 and is affixed thereto by a nut 22. The shank 23 of insulating bushing 19 may be immersed in insulating dielectric fluid 24 within casing 12.

Insulating bushing 19 includes an elongated tubular porcelain member 25 having a shoulder 27 intermediate its ends which rest against a wall portion of casing 12 with a resilient gasket 28 compressed therebetween. An annular clamping member 29 surrounding shank 23 bears against a fibre ring 30 fitting within a circumferential groove 31 in shank 23, and bolts 32 engaged within threaded holes in clamping member 29 bear against the interior surface of casing 12 to clamp bushing 19 on casing 12.

Tubular porcelain member 25 has a transverse bottom wall 33 with a central aperture therein which receives conductive bolt 17. A generally U-shaped contact spring 34 is affixed against bottom wall 33 within the axial bore 35 in porcelain member 25 by bolt 17 which extends through a clearance aperture in the cross-piece of U-shaped spring 34 and is engaged by nut 22 exterior of bushing 19. A resilient gasket 36 is compressed within an annular groove 37 in bottom wall 33 by a washer 38 beneath the head of bolt 17 to hermetically seal the lower end of porcelain member 25 against entry of dielectric fluid 24. The legs 40 of U-shaped contact spring 34 are generally of S-shape and are resiliently biased apart and provide high pressure contact against the internal surface of a square cross section portion of a conductive tube 14 which constitutes the bottom terminal of current limiting fuse 42 disposed within axial bore 35. Contact spring 34 electrically connects conductor 16 to fuse 42 and prevents rotation of square cross section tube 41, and thus fuse 42, within insulating bushing 19.

An internally threaded tubular conductive terminal 44 is affixed to the upper end of fuse 42. A conductive terminal cap 45 has a circumferential flange 46 disposed against the open upper end of porcelain member 25. Terminal cap 45 has eyebolt connector means 48 on the upper end thereof adapted to engage and clamp a power line conductor (not shown). Terminal cap 45 also has a depending threaded axial stud portion 49 adapted to be engaged within the internal threads on upper fuse terminal 44. An annular washer 51 preferably of nylon, a resilient annular clamping gasket 52, and a conical metallic clamping washer 53 surround stud portion 49 below terminal cap 45 and are retained as a unitary assembly therewith by a split ring 55 engaged within a circumferential groove in stud portion 49. A tubular spacer 56 is disposed between conical clamping washer 53 and the upper end of fuse 42. Turning of terminal cap 45 by a lineman advances fuse 42 (which is prevented from rotating by contact spring 34) toward terminal cap 45 and consequently causes conical clamping washer 53 to advance toward annular clamping gasket 52 and force it outward against the internal surface of porcelain member 25 to hermetically seal the open upper end of porcelain member 25 and mechanically hold fuse 42 within the bushing 19 by means of friction. It will be appreciated that such construction permits fast and easy replacement of a transformer primary fuse 42 without opening casing 12 or exposing the dielectric fluid 24 to the atmosphere.

The above described means for mounting the fuse 42 internally of the bushing to permit easy replacement thereof and for sealing the open end of the bushing does not constitute a part of my invention and is disclosed and claimed in the copending application of Donald W. Anderson, Ser. No. 407,390, filed Oct. 29, 1964, to which reference is made for details of construction.

Current limiting fuse 42 may include a tubular enclosing casing 60 of any suitable insulating material such as glass, ceramic, fiber, or glass fiber impregnated with a thermosetting resin, for example, epoxy resin. Annular metallic end pieces 61 are affixed adjacent the ends of casing 60 by suitable means such as epoxy cement and radially extending pins 62. The tubular terminals 41 and 44 are cemented within central openings in end pieces 61, and pins 65 extend diametrically through the fuse casing, the end pieces 61, and terminals 41 and 44 to securely hold these members together. An elongated insulating core, or spider, 66 is axially mounted within fuse casing 60 and has reduced diameter portions 67 at its ends which fit within the axial opening in tubular terminals 41 and 44. Spider 66 is of generally star-shaped cross section and has a plurality of radially protruding, peripherally spaced apart, longitudinally extending fins 67 and preferably is of a material adapted to evolve gas in the presence of an arc as disclosed in the copending application of Harvey W. Mikulecky, Ser. No. 408,017, filed Nov. 2, 1964, as a continuation-in-part of now abandoned, Ser. No. 313,640,, filed Oct. 3, 1963, and having the same assignee as the present invention and to which reference is made for details of construction. Spider 66 may be of a molded thermosetting composition comprising a water insoluble binder and an anti-tracking substance selected from the class consisting of the hydrates and oxides of aluminum and magnesium. One suitable material for spider 66 comprises approximately 75 percent aluminum hydrate filler, 20 percent polyester resin binder, and approximately 5 percent glass fiber. Spider 66 serves to support a circuit interrupting fusible element which may comprise a fusible ribbon 69 of suitable material such as silver helically wound on spider 66 so as to be in approximate line contact with fins 67 and touch only peripherally spaced apart portions of spider 66. A bead 80 of low melting temperature alloy such as tin-lead solder may be in intimate contact with fusible element 69 adjacent the midpoint thereof. Alternatively fusible element 69 may be of copper or comprise a thin wire of conductive material or a plurality of conductive wires or ribbons. The ends of fusible element 69 may be affixed by suitable means such as solder to radially bent cutout, or tab portions 70 on terminals 41 and 44. Disposed within the interior of casing 60 and embedding the spider 66 and the fusible element 69 is a body of granular inert or refractory material 72 of high dielectric strength such as sand or finely divided quartz.

The fusible element 69 attains fusing temperature and vaporizes when subjected to short circuit current, whereupon arcing occurs and the metal vapors rapidly expand to many times the volume originally occupied by the fusible element and are thrown into the spaces between the granules of inert filler material where they condense and are no longer available for current conduction. The physical contact between the hot arc and the relatively cool granules causes a rapid transfer of heat from the arc to the granules, thereby dissipating most of the arc energy with very little pressure buildup within the fuse enclosure. Consequently, a high resistance is, in effect, inserted into the path of the current and initially limits the current to a magnitude which is only a small portion of that available in the circuit. The inserted resistance increases rapidly and results in rapid decay of current and subsequent interruption of current with negligible generation of gas and noise.

Fusible element 69 is at the potential of the power line secured to connector means 48, and when current limiting fuse 42 passes through grounded transformer casing 12, the electric field concentration is a maximum. The danger of initiation of corona between fusible element 69 and the ground plane of transformer casing 12 when the fuse 42 is carrying rated current limits the power line voltage at which the current limiting fuse can be operated. The fusible element 69 is of relatively small cross section, and corona discharge may occur in the air surrounding the fuse 42 because of the proximity of the ground plane. I have discovered that the corona starting voltage and the voltage at which radio noise is started can be substantially increased by an electrostatic screen disposed between the fusible element 69 and the grounded casing 12 and connected to one of the terminals 41 or 44 of the fuse. In the preferred embodiment, the electrostatic screen comprises a conductive or semiconductive coating 74 on the exterior of the portion of fuse casing 60 adjacent grounded casing 12 and electrically connected to the lower fuse terminal 41. Preferably the entire lower portion of outer casing 60 is covered by conductive coating 74 and is electrically connected to lower fuse terminal 41 by the metallic lower end piece 61. The voltage at which a conductor, such as fusible element 69, goes into corona is approximately proportional to its diameter. The conductive coating 74 acts as a Faraday shield which increases the effective diameter of fusible element 69 to that of fuse tube 60 (or, alternatively, to that of bushing bore 35) and thus reduces the voltage stress and, consequently, raises the corona starting voltage and the voltage at which radio noise voltage is initiated between fusible element 69 and the ground plane 12.

When a current limiting fuse operates on a high current fault, a high resistance is, in effect, inserted into the path of the current and the magnitude of the current is abruptly reduced to zero. This high rate of change of current multiplied by the inductance of the circuit, frequently expressed as $$-L\frac{di}{dt}$$

results in a high peak arc voltage transient across the fuse 42. This peak arc voltage appears as a longitudinal voltage stress between the edge 75 of conductive coating 74 and the upper fuse terminal 44. The position of fuse 42 within grounded casing 12 and the insulating bushing 19 distorts the electric field and concentrates it adjacent the edge 75 of conductive coating 74. During high current interruption by fuse 42, the distortion of the electric field triggers initiation of corona and may cause the peak arc voltage transient to flashover between the edge 75 of coating 74 and the upper fuse terminal 44.

The edge 75 of conductive coating 74 is covered with high dielectric strength, thin wall material such as insulating tape 76, and preferably the tape 76 extends approximately one-half inch or more in an axial direction on both sides of the edge 75 of coating 74. The high dielectric strength covering 76 is able to absorb the high voltage stress without flashover and, in effect, reduces the voltage gradient across the air adjacent the edge 75 of coating 74 and substantially increases the peak arc voltage at which flashover occurs, thereby permitting increase in the interrupting rating of the fuse.

While only a single embodiment of the invention has been illustrated and described, many modifications and variations thereof will be readily apparent to those skilled in the art, and consequently it is intended in the appended claims to cover all such modifications and variations which come within the true spirit and scope of the invention.

I claim:

1. In combination, an encased electrical apparatus having a metallic casing, a tubular insulating bushing extending through an aperture in a wall portion of said casing, a current limiting fuse mounted within the axial opening in said bushing, said fuse including a hollow insulating housing, a fusible element within said housing electrically connected at one end to said apparatus and extending through said aperture and on opposite sides of said wall portion of said casing which wall portion is at ground potential, high dielectric strength granular material within said housing embedding said fusible element, and a conductive coating on said housing in surrounding relationship to said fusible element and electrically connected to one end only of said fusible element and disposed at the point of extension of said fusible element through said wall portion of said casing.

2. In combination an encased electrical apparatus having a metallic casing, a hollow insulating bushing extending through an aperture in a wall portion of said casing, a current limiting fuse mounted within said bushing including a tubular insulating housing, conductive terminals on the ends of said housing, a fusible element within said housing connected at its ends to said terminals and extending on opposite sides of said wall portion of said casing, high dielectric strength granular material within said housing embedding said fusible element, a conductive coating on said housing at the area of passage of said fusible element through said wall portion of said casing and in surrounding relationship to said fusible element and being electrically connected to only one of said terminals and having an edge spaced from the other of said terminals, and material of high dielectric strength on the exterior of said housing covering said edge of said coating; and conductive means extending through a wall portion of said bushing for electrically connecting one fuse terminal to said electrical apparatus.

3. In combination, an electrical apparatus having a metallic housing, a winding connected at one end to said metallic housing, a hollow ceramic bushing extending through an aperture in a wall portion of said housing, a current limiting fuse mounted within said hollow bushing for protecting said apparatus and limiting the magnitude of fault current in the circuit including said winding, said fuse including a hollow insulating casing, conductive terminals on the ends of said casing, a fusible element within said casing connected to said terminals and extending on opposite sides of said wall portion of said housing, high dielectric strength granular material within said housing embedding said fusible element, and an electrostatic screen on said hollow insulating casing in spaced surrounding relation to said fusible element and disposed between said fusible element and said wall portion of said metallic housing and being electrically connected to one only of said terminals; and conductive means extending through a wall of said bushing for electrically connecting one fuse terminal to the other end of said winding.

4. The combination in accordance with claim 3 wherein said electrostatic screen has an edge spaced from the other fuse terminal and including high dielectric strength material covering said edge.

5. In combination, an encased electrical apparatus having a metallic casing, an insulating bushing having an axial opening and extending through an aperture in a wall portion of said casing which wall portion is at ground potential, a current limiting fuse mounted within said axial opening and including a fusible element electrically connected at one end to said electrical apparatus and extending through said aperture on opposite sides of said wall portion of said casing, and an electrostatic screen disposed on said current limiting fuse at the point of passage of said fusible element through said wall portion of said casing and arranged in surrounding relationship with said fusible element between said fusible element and said wall portion of said metallic casing and being connected to one end of said fusible element.

References Cited by the Examiner

UNITED STATES PATENTS

| 1,058,143 | 4/1913 | Bitter et al. | 200—120 |
| 1,726,097 | 8/1929 | Austin | 174—142 |
| 2,567,768 | 9/1951 | Fahnoe | 200—117 X |
| 2,667,549 | 1/1954 | Fahnoe et al. | 200—120 |
| 2,877,322 | 3/1959 | Harner | 200—120 |
| 3,015,008 | 12/1961 | Chubala et al. | 200—120 |
| 3,244,838 | 4/1966 | Astleford | 200—120 |

FOREIGN PATENTS

| 223,216 | 9/1958 | Australia. |

BERNARD A. GILHEANY, *Primary Examiner.*

H. B. GILSON, *Assistant Examiner.*